US012638881B2

(12) United States Patent
Lee et al.

(10) Patent No.: US 12,638,881 B2
(45) Date of Patent: May 26, 2026

(54) DISPLAY APPARATUS AND METHOD OF FABRICATING THE SAME

(71) Applicant: LG Display Co., Ltd., Seoul (KR)

(72) Inventors: Dae-Jin Lee, Paju-si (KR); Hyun-Chul Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 93 days.

(21) Appl. No.: 18/512,851

(22) Filed: Nov. 17, 2023

(65) Prior Publication Data

US 2024/0219961 A1     Jul. 4, 2024

(30) Foreign Application Priority Data

Dec. 28, 2022     (KR) ........................ 10-2022-0186711

(51) Int. Cl.
| | |
|---|---|
| *G06F 1/16* | (2006.01) |
| *B60K 35/22* | (2024.01) |
| *G06F 1/18* | (2026.01) |

(52) U.S. Cl.
CPC ............ *G06F 1/163* (2013.01); *B60K 35/223* (2024.01); *G06F 1/1652* (2013.01); *G06F 1/182* (2013.01); *B60K 2360/96* (2024.01); *G06F 2200/161* (2013.01)

(58) Field of Classification Search
CPC ........ G06F 1/163; G06F 1/1652; G06F 1/182; G06F 2200/161; B60K 35/223; B60K 2360/96; H10K 59/873
See application file for complete search history.

(56) References Cited

U.S. PATENT DOCUMENTS

| | | | | |
|---|---|---|---|---|
| 9,276,055 | B1 * | 3/2016 | Son | H10K 59/8791 |
| 9,425,418 | B2 * | 8/2016 | Kwon | H10K 59/8792 |
| 10,073,309 | B2 * | 9/2018 | Abe | G02F 1/134363 |
| 10,153,457 | B2 * | 12/2018 | Son | H01L 25/167 |
| 10,720,485 | B2 * | 7/2020 | Aoki | H10K 59/8791 |
| 11,169,312 | B2 * | 11/2021 | Kimura | G09F 9/30 |
| 11,194,184 | B2 * | 12/2021 | Zhang | G02F 1/133528 |
| 11,394,004 | B2 * | 7/2022 | Kim | H10K 59/8791 |
| 11,570,911 | B2 * | 1/2023 | Shin | G06F 3/046 |
| 11,605,799 | B2 * | 3/2023 | Cheng | H10K 59/873 |
| 11,798,928 | B2 * | 10/2023 | Shin | H01L 25/18 |
| 11,917,775 | B2 * | 2/2024 | Wang | H05K 5/0217 |
| 12,067,205 | B2 * | 8/2024 | Kim | G06F 3/04164 |
| 12,471,438 | B2 * | 11/2025 | Jin | H10K 50/8426 |
| 2017/0045672 | A1 * | 2/2017 | Lee | H10D 86/60 |
| 2019/0074332 | A1 * | 3/2019 | Kim | G01K 13/00 |
| 2019/0198801 | A1 | 6/2019 | Kuon et al. | |
| 2021/0328196 | A1 * | 10/2021 | Cao | H10K 59/131 |
| 2022/0399375 | A1 * | 12/2022 | Wang | H10D 86/411 |

(Continued)

FOREIGN PATENT DOCUMENTS

| | | |
|---|---|---|
| KR | 10-2019-0026497 A | 3/2019 |
| KR | 10-2019-0076811 A | 7/2019 |

*Primary Examiner* — Rockshana D Chowdhury
*Assistant Examiner* — Martin Antonio Asmat Uceda
(74) *Attorney, Agent, or Firm* — Birch, Stewart, Kolasch & Birch, LLP

(57) ABSTRACT

A display apparatus includes a display panel having a display region, a non-display region, and a bending region. The display apparatus further includes a polarizing plate attached to the display panel, and a micro protective layer formed on the bending region. The micro protective layer is in contact with a side surface of the polarizing plate.

6 Claims, 8 Drawing Sheets

(56)  References Cited

U.S. PATENT DOCUMENTS

| | | | |
|---|---|---|---|
| 2023/0107800 A1* | 4/2023 | Hwang | H10K 77/111 |
| | | | 257/40 |
| 2024/0268212 A1* | 8/2024 | Zeng | H05K 5/0217 |
| 2024/0389408 A1* | 11/2024 | Du | H10K 59/131 |
| 2025/0031557 A1* | 1/2025 | Lee | H10K 59/8792 |
| 2025/0076713 A1* | 3/2025 | Shi | C09J 7/20 |

* cited by examiner

FIG. 5
fabricating a display panel & preparing a polarizing plate —S101
↓
attaching the polarizing plate —S102
↓
forming a micro protective layer —S103
↓
trimming the polarizing plate —S104
FIG. 6A
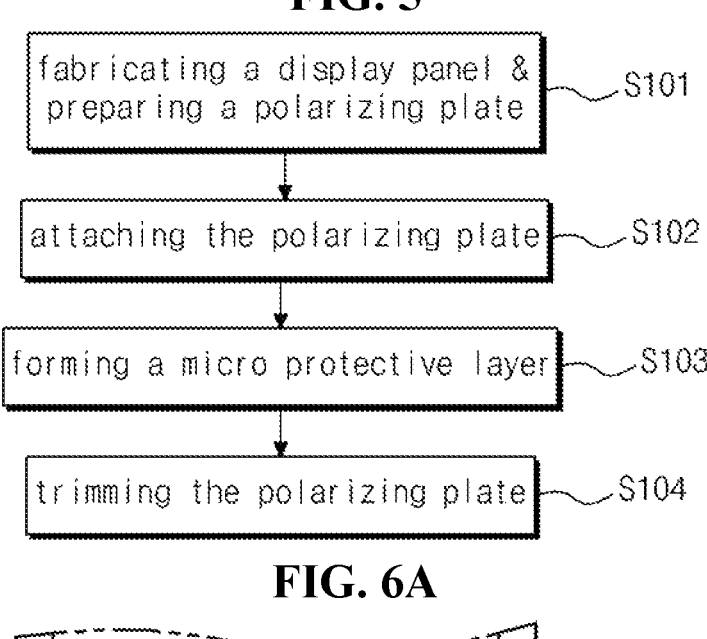
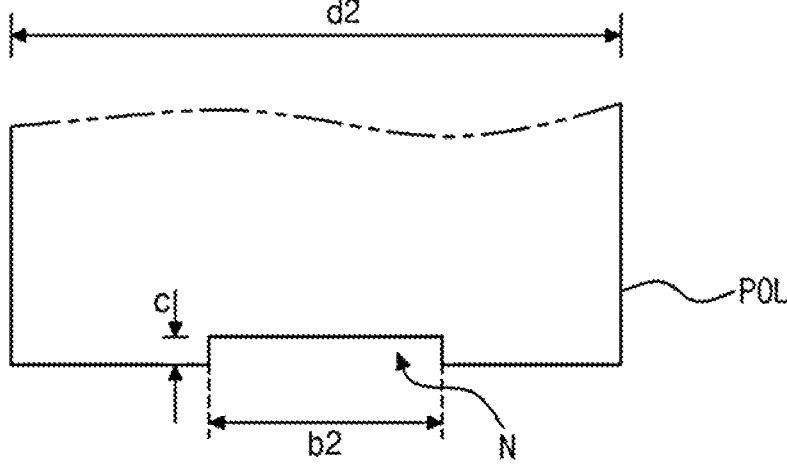

FIG. 9

DISPLAY APPARATUS AND METHOD OF FABRICATING THE SAME

CROSS REFERENCE TO RELATED APPLICATIONS

The present application claims priority to Korean Patent Application No. 10-2022-0186711 filed in Republic of Korea on Dec. 28, 2022, the entire contents of which is hereby expressly incorporated by reference into the present application.

BACKGROUND

Field of the Invention

The present invention relates to a flexible display apparatus and a method of fabricating the same.

Discussion of the Related Art

As information technology has been developed, a variety of display apparatuses that display information have been developed rapidly. Accordingly, various display apparatuses with excellent performance such as thin profile, light weight, and lower power consumption have been developed.

In addition, research has been actively conducted on various display apparatuses such as flexible, bendable, stretchable, and rollable display apparatuses that can be applied to automobiles or wearable electronic devices.

However, in these flexible, bendable, stretchable, and rollable display apparatuses, stress can be concentrated at specific regions, for example, at a curved region, a bending region, a stretching region, and a rolling region. This concentration of stress can cause disconnection of lines arranged in the display apparatuses.

SUMMARY OF THE INVENTION

Accordingly, the present invention is directed to a display apparatus and a method of fabricating the same that substantially obviates one or more of the problems due to limitations and disadvantages of the related art.

An advantage of the present invention is to provide a display apparatus and a method of fabricating the same, which can include a micro protective layer in a bending region and prevent defects and other limitations such as breakage of line which can occur due to stress during bending of the bending region.

Another advantage of the present invention is to provide a display apparatus and a method of fabricating the same, which can include a stopper that prevents an organic material from spreading on a polarizing plate when coating the organic material with fluidity to form a micro protective layer and prevent the micro protective layer from being formed in a region other than a bending region.

Additional features and advantages of the invention will be set forth in the description which follows, and in part will be apparent from the description, or can be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described herein, a display apparatus includes a display panel including a display region, a non-display region, and a bending region; a polarizing plate attached to the display panel; and a micro protective layer formed on the bending region, wherein the micro protective layer is in contact with a side surface of the polarizing plate.

In another aspect, a method of fabricating a display apparatus includes providing a display panel including a bending region; attaching a polarizing plate, which includes a flow control member, for controlling flow of an organic material, formed in a region corresponding to the bending region, to the display panel; coating and curing the organic material on the bending region to form a micro protective layer; and removing the flow control member, wherein the micro protective layer is formed to be in contact with a side surface of the polarizing plate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings:

FIG. 5 is a flow chart illustrating a method of fabricating a display apparatus according to an embodiment of the present invention;

FIGS. 6A to 6D are views illustrating a method of fabricating a display apparatus according to an embodiment of the present invention in detail;

FIG. 9 is a view illustrating a polarizing plate of a display apparatus according to another embodiment of the present invention.

DETAILED DESCRIPTION OF THE EMBODIMENTS

Figure 1:
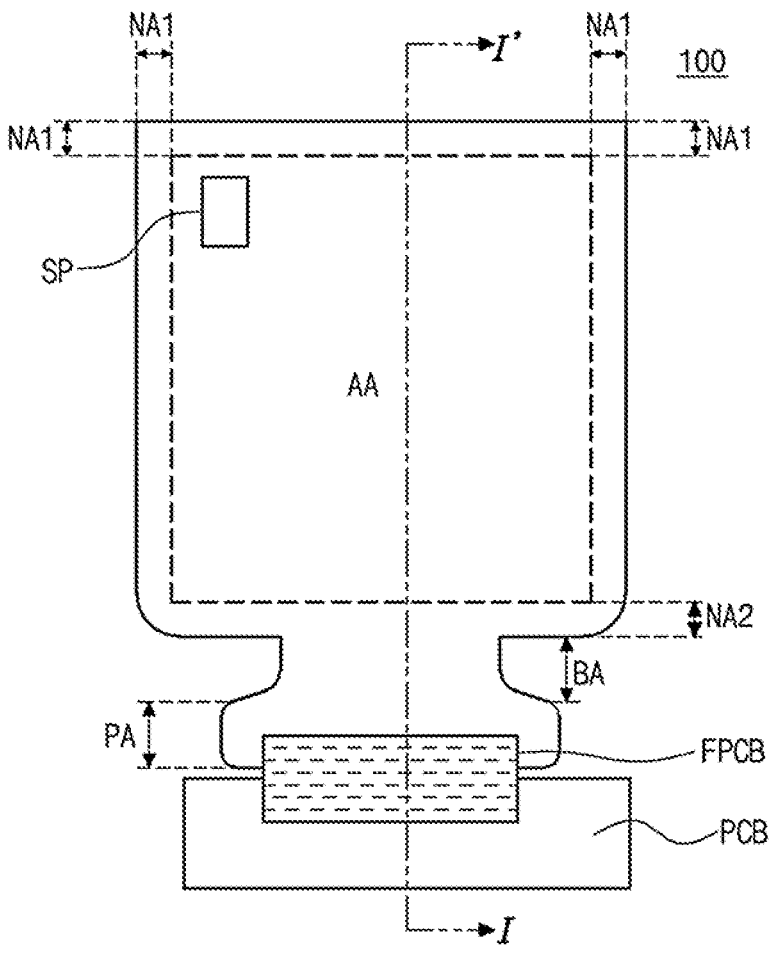
FIG. 1 is a plan view schematically illustrating a display apparatus according to an embodiment of the present invention.

Advantages and features of the embodiments of the present invention and methods of achieving them will be apparent with reference to the embodiments described below in detail with the accompanying drawings. However, the present invention is not limited to the embodiments disclosed below, but can be realized in a variety of different forms, and only these embodiments allow the present invention to be complete. The present invention is provided to fully inform the scope of the invention to the skilled in the art of the present invention, and the present invention can be defined by the scope of the claims.

The shapes, sizes, proportions, angles, numbers, and the like disclosed in the drawings for explaining the embodiments of the present invention are illustrative, and the present invention is not limited to the illustrated matters. The same reference numerals refer to the same components throughout the description.

Furthermore, in describing the embodiments of the present invention, if it is determined that a detailed description of the related known technology unnecessarily obscure the subject matter of the present invention, the detailed description thereof can be omitted. When 'comprising', 'including', 'having', 'consisting', and the like are used in this invention, other parts can be added unless 'only' is used. When a component is expressed in the singular, cases including the plural are included unless specific statement is described.

In interpreting the components, even if there is no separate explicit description, it is interpreted as including a margin range.

In the case of a description of a positional relationship, for example, when the positional relationship of two parts is described as 'on', 'over', 'above', 'below', 'beside', 'under', and the like, one or more other parts can be positioned between such two parts unless 'right' or 'directly' is used.

In the case of a description of a temporal relationship, for example, when a temporal precedence is described as 'after', 'following', 'before', and the like, cases that are not continuous can be included unless 'directly' or 'immediately' is used.

In describing components of the embodiments of the present invention, terms such as first, second and the like can be used. These terms are only for distinguishing the components from other components, and an essence, order, sequence, or number of the components is not limited by the terms. Further, when it is described that a component is "connected", "coupled" or "contact" to another component, the component can be directly connected or contact the another component, but it should be understood that other component can be "interposed" between the components.

In this invention, an "display apparatus" can include a display apparatus in a narrow sense, such as a display module including a display panel and a driving portion for driving the display panel. Furthermore, the "display apparatus" can include a complete product or final product including a display module which is a notebook computer, a television, a computer monitor, an automotive display or equipment display including other type of vehicle, or a set electronic device or set device or set apparatus such as a mobile electronic device which is a smart phone, an electronic pad or the like.

Therefore, the apparatus according to one or more embodiments of this invention can include a display apparatus itself such as a display module, and an application product or a set device that is an end-user device, including a display module.

The term "exemplary" is used to mean an example, and is interchangeably used with the term "example". Further, embodiments are example embodiments and aspects are example aspects. Any implementation described herein as an "exemplary" or "example" is not necessarily to be construed as preferred or advantageous over other implementations.

Features of various embodiments of the present invention can be partially or entirely coupled to or combined with each other and can be operated, linked, or driven together in various ways. Embodiments of the present invention can be carried out independently from each other, or can be carried out together in co-dependent or related relationship. In one or more aspects, the components of each display apparatus according to various embodiments of the present invention are operatively coupled and configured.

Hereinafter, embodiments of the present invention are described in detail with reference to the drawings.

FIG. 1 is a plan view schematically illustrating a display apparatus according to an embodiment of the present invention.

As shown in FIG. 1, a display apparatus 100 according to the embodiment of the present invention can include a display region (active region) AA where an image is displayed, and a first non-display region (first non-active region) NA1 and a second non-display region (second non-active region) NA2 which are formed outside the display region AA.

The first and second non-display regions NA1 and NA2 can be formed outside the display region AA. For example, the first non-display area NA1 can be formed on at least one of left and right sides of the display region AA and on an upper side of the display region AA, and the second non-display region NA2 can be formed on a lower side of the display region AA. The first and second non-display regions NA1 and NA2 can surround the display region AA entirely or only in part.

In an embodiment, a plurality of subpixels SP are arranged in the display regions AA to display an image. The plurality of subpixels SP are defined by gate lines and data lines which cross each other, and at least one thin film transistor and various electrodes are disposed in each of the plurality of subpixels SP.

When the display apparatus 100 is an organic electroluminescent display apparatus, an organic light emitting element can be disposed in each subpixel SP of the display region AA. In another example, when the display apparatus 100 is a liquid crystal display apparatus, a liquid crystal layer and an alignment layer can be disposed in each subpixel SP of the display region AA. In still another example, when the display apparatus 100 is an electrophoretic display apparatus, an electrophoretic layer can be disposed in each subpixel SP of the display region AA. In another example, when the display apparatus 100 is a quantum dot display apparatus, a quantum dot layer can be disposed in each subpixel SP of the display region AA. Still, alternatively, when the display apparatus 100 is a micro light emitting diode (LED) display apparatus, a micro LED can be disposed in each subpixel SP of the display region AA, and when the display apparatus 100 is a mini LED display apparatus, a mini LED can be disposed in each subpixel SP of the display region AA.

Various lines for supplying various signals to the display region AA can be arranged in the first and second non-display regions NA1 and NA2. For example, lines that apply driving signals such as data enable signal, vertical synchronization signal, horizontal synchronization signal, and clock signal, and power lines that supply power signals such as high potential voltage (VDD) and low potential voltage (VSS), data link lines supplying data signals, gate link lines supplying scan signals, and the like can be disposed in the non-display region NA.

A gate driving portion can be disposed in the first non-display region NA1. The gate driving portion applies a scan signal to the gate line through the gate link line in response to a gate timing control signal supplied from a timing control portion. The gate driving portion can be mounted in the non-display region NA in a form of an integrated circuit (IC), or can be formed directly in the non-display region NA in a form of a gate-in panel (GIP) including a thin film transistor.

A pad region PA is formed at a lower end of the second non-display region NA2, so that one side of a flexible printed circuit board FPCB is attached to the pad region PA, and the other side of the flexible printed circuit board FPCB is attached to a printed circuit board PCB. Pads can be disposed in the pad region PA. The pads electrically connect various lines arranged in the first and second non-display regions NA1 and NA2 with various lines formed on the flexible printed circuit board FPCB. The lines of the flexible printed circuit board FPCB are electrically connected to various lines formed on the printed circuit board PCB, so that the signals supplied from the printed circuit board PCB pass through the flexible printed circuit board FPCB and the pads to the display region AA.

A data driving portion that supplies image signals to the display region AA can be mounted on the flexible printed circuit board FPCB, and the timing control portion, a power driving portion, and the like can be placed on the printed circuit board PCB, but not limited thereto.

A bending region BA is formed between the pad region PA and the non-display region NA. The display apparatus 100 according to an embodiment of the present invention can be formed of a flexible material such as plastic and can be curved (or bent), and the bending region BA can be bent to the back of the display apparatus 100 so that the pad region PA and the printed circuit board PCB can be located on the rear of the display apparatus 100. As such, by placing the pad region PA and the printed circuit board PCB on the rear of the display apparatus 100, a narrow bezel can be achieved.

Meanwhile, in the drawing, the flexible printed circuit board FPCB is attached to the pad region PA and electrically connected to the printed circuit board PCB. However, the printed circuit board PCB can be attached directly to the pad region PA of the display apparatus 100.

Figure 2:
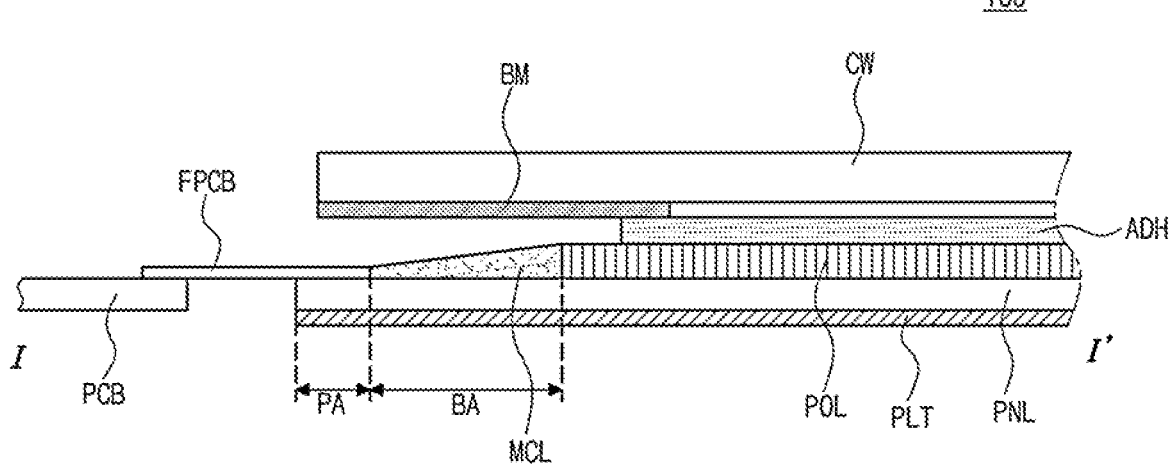
FIG. 2 is a cross-sectional view taken along a line I-I' of FIG. 1.

FIG. 2 is a cross-sectional view taken along a line I-I' of FIG. 1.

As shown in FIG. 2, the display apparatus 100 includes a display panel PNL on which an image is displayed, a back plate PLT attached to a lower surface (or bottom surface) of the display panel PNL, a polarizing plate POL disposed on an upper surface (or top surface) of the display panel PNL, and a front member CW disposed on an upper surface of the polarizing plate POL.

The display panel PNL can include the display region AA where the actual image is displayed, and the non-display region NA1 and NA2 which is located outside the display region AA and in which the gate driving portion and various lines are placed.

The bending region BA and the pad region PA are formed at the lower side of the display region AA. The pads are formed in the pad region PA, and the pad region PA is attached to one side of the flexible printed circuit board FPCB. The other side of the flexible printed circuit board FPCB is attached to the printed circuit board PCB.

When the display apparatus 100 is a liquid crystal display apparatus, the polarizing plate POL can realize an image by adjusting transmittance of light which passes through the display apparatus. When the display apparatus 100 is an organic electroluminescent display apparatus, a micro LED display apparatus, or a mini LED display apparatus, the polarizing plate POL can improve visibility of the display apparatus by blocking reflection of an external light input from the outside.

The back plate PLT serves to protect the flexible display panel PNL and can be made of a thin and flexible metal plate, but not limited thereto.

The front member CW is disposed over the display panel PNL to protect the display panel PNL from external shock or foreign substance such as moisture. The front member CW can be formed in a multi-layer structure. For example, the front member CW can include foldable glass or flexible film, and further, include various protective films or protective layers to protect the front glass or film. In this respect, the front member CW can be called by various terms such as front glass or front window.

The front member CW can be formed to a thickness of 100 um or less for bending, but not limited to this thickness.

A black matrix BM is formed on an edge of a lower surface of the front member CW to block light output from the display panel PNL from leaking to the edge. The black matrix BM can be formed of metal oxide such as CrOx, black resin, or black ink, but not limited thereto.

The front member CW can be attached to the upper surface of the polarizing plate POL using an adhesive ADH. The adhesive ADH can be formed of an OCA (Optical Clear Adhesive) in a form of a film. For example, the adhesive ADH is placed between the front member CW and pressure is applied to the front member CW and the polarizing plate POL, so that the front member CW can be attached to the polarizing plate POL or the polarizing plate POL can be attached to the front member CW. However, the adhesive ADH is not limited to the OCA and can be formed of an OCR (Optical Clear Resin) or the like.

A micro protective layer MCL is formed in the bending region BA of the display panel PNL. The micro protective layer MCL is used to prevent thin film layers and electrical elements disposed in the bending region BA from being damaged when the bending region BA is bent, and this is described in more detail below.

Figures 3A, 3B:
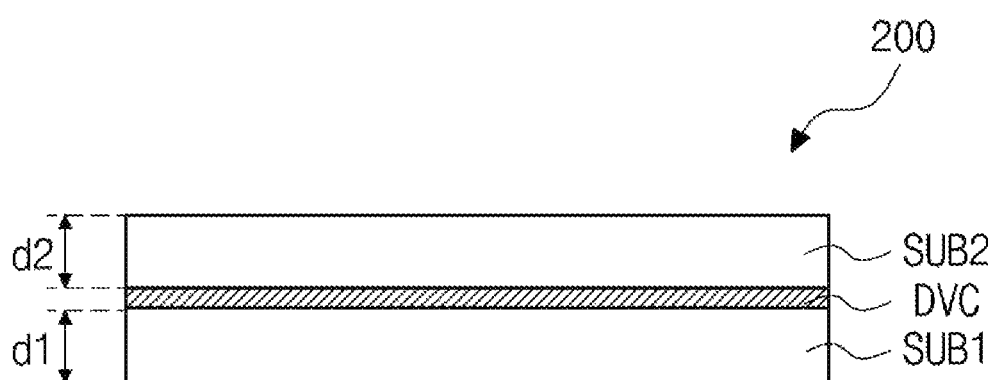
FIGS. 3A and 3B are example views illustrating a flexible display apparatus and are views for explaining a micro protective layer.

FIGS. 3A and 3B are exemplary views illustrating a flexible display apparatus and are views for explaining a micro protective layer.

As shown in FIG. 3A, a flexible display apparatus 200 includes a first substrate SUB1, a second substrate SUB2, and an element layer (or device layer) DVC disposed between the first and second substrates SUB1 and SUB2. The first substrate SUB1 and the second substrate SUB2 are flexible substrates that can be bent, and the element layer DVC can include thin film transistors, various metal lines, and thin film layers. At this time, the first substrate SUB1 and the second substrate SUB2 have the same thickness (i.e., d1=d2, where d1 and d2 are thicknesses of the first and second substrates SUB1 and SUB2, respectively) and the same elastic modulus.

As shown in FIG. 3B, when the flexible display apparatus 200 is bent in one direction, for example, toward the first substrate SUB1, the first substrate SUB1 is reduced in length and the second substrate SUB2 is stretched in length, so that compression stress occurs in the first substrate SUB1 and tension stress occurs in the second substrate SUB2. At this time, there is a plane (or surface) whose length does not change in a middle part of the flexible display apparatus 200, and this plane is referred to as a neutral plane.

In this regard, when a material is subjected to tensile stress or compressive stress, it expands or shrinks to a certain extent. However, neither tension nor compression occurs in the neutral plane, and the neutral plane is a region where a strain is essentially zero.

Here, the strain represents a ratio in amount of a changed length or volume to an original length or volume, and since no change substantially occurs in the neutral plane, the strain is substantially zero. Therefore, even if the flexible flat panel display apparatus 200 is bent, the strain remains zero in the neutral plane.

As shown in FIG. 3B, when bending occurs in the flexible display apparatus 200, compression stress occurs in the first substrate SUB1 and tension stress occurs in the second substrate SUB2, but the element layer DVC between the first substrate SUB1 and the second substrate SUB2 is located in the neutral plane, neither tension nor compression substantially occurs in the element layer DVC.

Referring again to FIG. 2, the micro protective layer MCL serves to ensure that various lines and elements arranged in the bending region BA are located in the neutral plane. A position of the neutral plane varies depending on thicknesses and elastic moduli of the display panel PNL below and over the lines and elements. In an embodiment of the present invention, since a thickness of a lower structure below the lines and elements is greater than a thickness of an upper structure over the lines and elements, the micro protective layer MCL is formed over the lines and elements to adjust the thicknesses of upper and lower parts so that the micro protective layer MCL allows the lines and elements therebelow to be positioned in the neutral plane.

The micro protective layer MCL is formed on the upper surface of the display panel PNL to ensure that various lines and thin film layers which transmit signals from the pad region PA to the display region AA are located in the neutral plane, thereby preventing damage to the lines due to stress. In addition, the micro protective layer MCL is formed of an organic material such as polymer and can protect various lines arranged in the bending region BA from an external environment. However, the micro protective layer (MCL) is not limited to the above material.

Since the micro protective layer MCL serves to form the neutral plane, a thickness of the micro protective layer MCL can be determined depending on thicknesses and materials (i.e., elastic moduli) of layers located below the lines disposed in the bending region BA, and the material of the micro protective layer MCL.

The micro protective layer MCL can be formed beyond the bending region BA to the region where the polarizing plate POL is located. Since the organic material used to form the micro protective layer MCL has fluidity, when coating the organic material to form the micro protective layer MCL, the polarizing plate POL acts as a stopper that controls the flow of the organic material. This is explained in more detail later.

Figure 4:
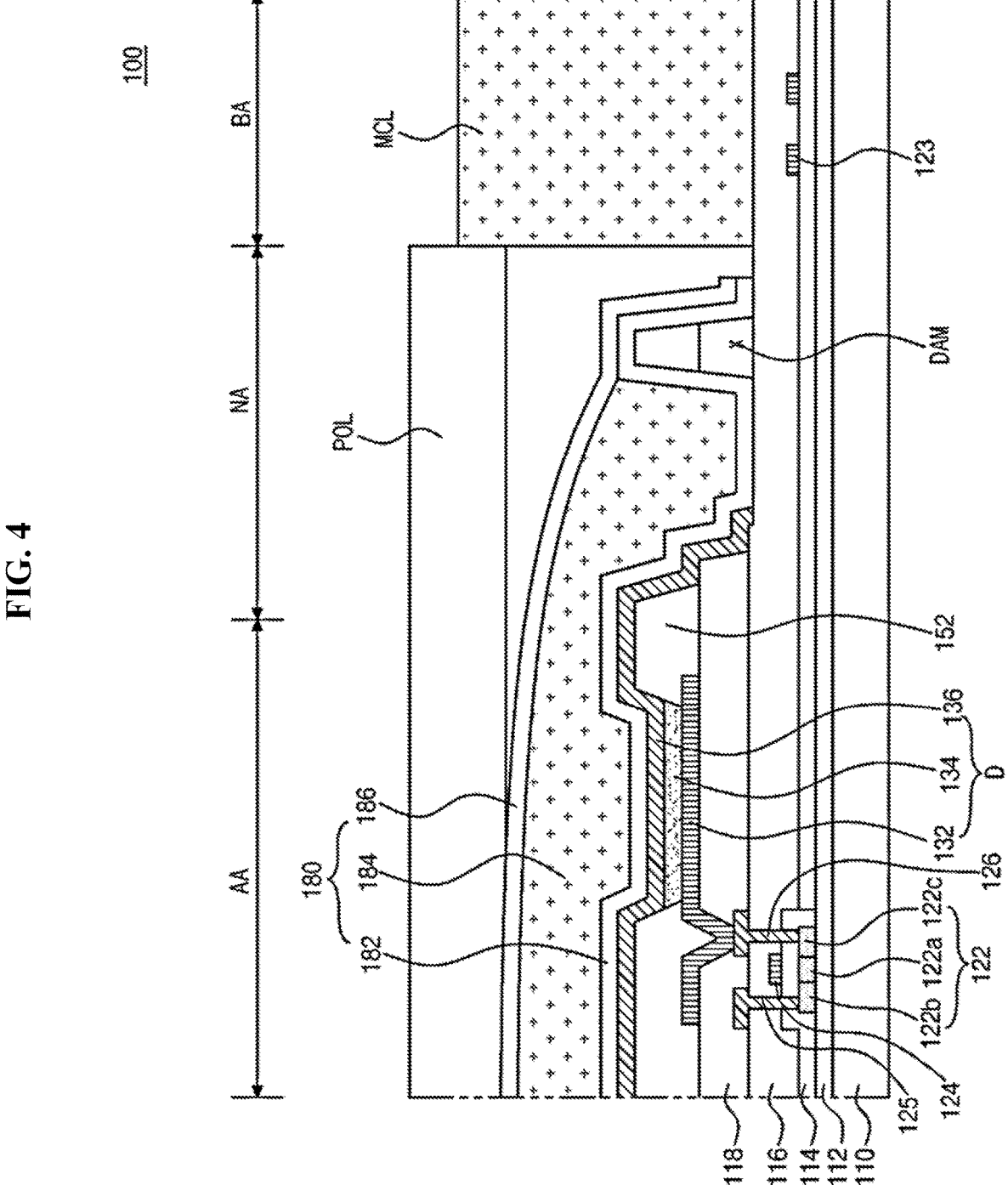
FIG. 4 is a cross-sectional view illustrating a display apparatus according to an embodiment of the present invention in more detail.

FIG. 4 is a cross-sectional view illustrating a display apparatus according to an embodiment of the present invention in more detail. For convenience of explanation, an organic electroluminescent display apparatus is described as an example.

As shown in FIG. 4, the display panel in the display apparatus according to an embodiment of the present invention includes a display region (active area) AA, a non-display region (non-active area) NA, and a bending region (bending area) BA. The display panel includes a substrate 110. The substrate 110 can be formed of a flexible plastic-based material. As the plastic-based material, at least one of polyimide, polymethylmethacrylate, polyethylene terephthalate, polyethersulfone, and polycarbonate can be used, but not limited thereto.

For example, when the substrate 110 is formed of polyimide, the substrate 110 can include a plurality of polyimides, and an inorganic layer can be further disposed between the polyimides, but not limited thereto.

A buffer layer 112 is formed on the substrate 110. The buffer layer 112 is formed over the entire substrate 110 to improve adhesion between the layers formed on the substrate 110 and the substrate 110, and to prevent various types of defects, such as alkaline components leaking from the substrate 110. In addition, the buffer layer 112 can delay diffusion of moisture or oxygen that penetrates into the substrate 110.

The buffer layer 112 can be formed of a single layer of SiNx or SiOx, or multiple layers using SiNx and SiOx. When the buffer layer 112 is formed of multiple layers, SiOx and SiNx can be formed alternately. The buffer layer 112 can be omitted based on type and material of the substrate 110, structure and type of a thin film transistor, etc.

A thin film transistor is formed on the buffer layer 112 in the display region AA. For convenience of explanation, a driving thin film transistor is shown among various thin film transistors that can be disposed in the display region AA, but other thin film transistor such as switching thin film transistor can also be included in the display region AA. Further, in the drawing, the thin film transistor having a top gate structure is shown, but it is not limited to this structure and can be implemented in other structure such as a bottom gate structure.

The thin film transistor includes a semiconductor layer 122 disposed on the buffer layer 112, a gate insulating layer 114 formed on the semiconductor layer 122, a gate electrode 124 disposed on the gate insulating layer 114, an interlayered insulating layer 116 formed on the gate electrode 124, and a source electrode 125 and a drain electrode 126 disposed on the interlayered insulating layer 116.

The semiconductor layer 122 can be formed of a polycrystalline semiconductor. For example, a polycrystalline semiconductor can be made of low temperature polysilicon (LTPS) with high mobility, but not limited thereto.

Alternatively, the semiconductor layer 122 can be formed of an oxide semiconductor. For example, the semiconductor layer 122 can include one of indium-gallium-zinc-oxide (IGZO), indium-zinc-oxide (IZO), indium-gallium-tin-oxide (IGTO), and indium-gallium-oxide (IGO), but not limited thereto. The semiconductor layer 122 includes a channel region 122a in a central region, and a source region 122b and a drain region 122c as doping regions on both sides.

The gate insulating layer 114 can be formed in the display region AA, the non-display region NA and the bending region BA, or can be formed only in the display region AA. The gate insulating layer 114 can be formed in a single layer or multiple layers using an inorganic material such as SiOx or SiNx, but not limited thereto.

The gate electrode 124 is formed of metal. For example, the gate electrode 124 is formed in a single layer or multiple layers using at least one of molybdenum (Mo), aluminum (Al), chromium (Cr), gold (Au), titanium (Ti), nickel (Ni), neodymium (Nd), copper (Cu), and alloy thereof, but not limited thereto.

The interlayered insulating layer 116 can be formed in the display region AA, the non-display region NA and the bending region BA. The interlayered insulating layer 116 can be formed in a single layer or multiple layers using an organic material such as photoacrylic, or an inorganic material such as SiNx or SiOx. Alternatively, the interlayered insulating layer 116 can be formed in multiple layers including an organic material layer and an inorganic material layer, but not limited thereto.

The source electrode 125 and the drain electrode 126 can be formed in a single layer or multiple layers using metal such as Cr, Mo, Ta, Cu, Ti, Al, or Al alloy, but not limited thereto. The source electrode 125 and the drain electrode 126 are in ohmic contact with the source region 122b and drain region 122c of the semiconductor layer 122 through contact holes formed in the gate insulating layer 114 and the interlayered insulating layer 116, respectively.

A bottom shield metal layer can be disposed on the substrate 110 below the semiconductor layer 122. The bottom shield metal layer serves to prevent afterimages or deterioration in performance of transistor by minimizing back channel phenomenon caused by charges trapped in the substrate 110, and can be formed in a single or multiple layers using Ti, Mo, or an alloy of Ti and Mo, but not limited thereto.

A planarization layer 118 is formed on the substrate 110 on which the thin film transistor is formed. The planarization layer 118 is formed in the display region AA, and can extend to the bending region BA. The planarization layer 118 can be formed of an organic material such as photoacrylic, but not limited thereto and can be formed in multiple layers including an inorganic layer and an organic layer.

An organic light emitting element D is disposed on the planarization layer 118 in the display region AA. The organic light emitting element D includes a first electrode 132, an organic layer 134, and a second electrode 136.

The first electrode 132 is disposed on the planarization layer 118 and is electrically connected to the drain electrode 126 through a contact hole formed in the planarization layer 118. The first electrode 132 can be formed in a single layer or multiple layers using metal such as Ca, Ba, Mg, Al, Ag, or alloy thereof, and is electrically connected to the drain electrode 126 of the thin film transistor. Alternatively, the first electrode 132 can be formed of a transparent metal oxide such as ITO (Indium Tin Oxide) or IZO (Indium Zinc Oxide), but not limited thereto.

When the display apparatus 100 is a top emission type display apparatus, the first electrode 132 can be formed of metal such as Ca, Ba, Mg, Al, Ag or alloy thereof and reflect light emitted from the organic layer 134 to improve light efficiency. In addition, the first electrode 132 can further include a transparent metal oxide with a high work function, such as ITO or IZO.

When the display apparatus 100 is a bottom emission type display apparatus, the first electrode 132 can be formed of a metal oxide such as ITO or IZO.

A bank layer 152 is formed at a boundary of each subpixel on the planarization layer 118. The bank layer 152 can be a type of partition that defines the subpixel. The bank layer 152 divides the subpixels to prevent light of a specific color output from adjacent subpixel from being mixed and output.

The bank layer 152 be formed of at least one of an inorganic insulating material such as SiNx or SiOx, an organic insulating material such as BCB (BenzoCycloButene), acryl resin, epoxy resin, phenolic resin, polyamide resin or polyimide resin, and a photosensitive agent containing black pigment, but not limited thereto.

The organic layer 134 is formed on the first electrode 132 and on a portion of an inclined surface of the bank layer 152. The organic layers 134 can include a red (R) emitting layer emitting red light and formed in a R subpixel, a green (G) emitting layer emitting green light and formed in a G subpixel, and a blue (B) emitting layer emitting blue light and formed in a B subpixel. Alternatively, the organic layers 134 can include white (W) emitting layers emitting white light. For example, the organic layer 134 can include an organic emitting layer, or an inorganic emitting layer such as a nano-sized material layer, a quantum dot, a micro LED emitting layer, or a mini LED emitting layer, but not limited thereto.

The organic layer 134 includes not only an emitting layer, but also an electron injection layer and a hole injection layer, which respectively inject electrons and holes into the emitting layer, and an electron transport layer, a hole blocking layer, an electron blocking layer, and a hole transport layer which transport the injected electrons and holes to the emitting layer, but not limited thereto.

The second electrode 136 is disposed on the organic layer 134 and can be formed in a single layer or multiple layers using metal. Alternatively, the second electrode 136 can be formed of a transparent metal oxide such as ITO or IZO, but not limited thereto.

When the display apparatus 100 is a top emission type display apparatus, the second electrode 136 can include a transflective conductive material that semi-transmits light. For example, the second electrode 136 can be formed of at least one alloy of LiF/Al, CsF/Al, Mg:Ag, Ca/Ag, Ca:Ag, LiF/Mg:Ag, LiF/Ca/Ag and LiF/Ca:Ag.

When the display apparatus 100 is a bottom emission type display apparatus, the second electrode 136 can be formed of at least one of Ag, Al, Au, Mo, W, Cr, or alloy thereof, but not limited thereto.

In addition, the organic light emitting element D can be configured in a tandem structure. The tandem structure includes a plurality of organic emitting layers, and a charge generation layer can be interposed between the organic emitting layers. The charge generation layer is used to control charge balance between the plurality of organic emitting layers, and can be formed of a plurality of layers including a first charge generation layer and a second charge generation layer. The charge generation layer can include an N-type charge generation layer and a P-type charge generation layer, and can be formed of an organic layer doped with an alkali metal such as Li, Na, K, or Cs, or an alkaline earth metal such as Mg, Sr, Ba, and Ra, but not limited thereto.

An encapsulation layer 180 is formed on the organic light emitting element D. When the organic light emitting element D is exposed to foreign substance such as moisture or oxygen, subpixel shrinkage phenomenon, in which an emission region is reduced, can occur, or defect such as dark spots within the emission region can occur. In addition, moisture or oxygen oxidizes electrodes made of metal. The encapsulation layer 180 blocks the penetration of foreign substances such as oxygen and moisture from the outside and prevents defects in the organic light emitting element D and various electrodes.

The encapsulation layer 180 can include a first inorganic encapsulation layer 182, an organic encapsulation layer 184, and a second inorganic encapsulation layer 186, but not limited thereto and can include two layers, or four or more layers.

The first inorganic encapsulation layer 182 and the second inorganic encapsulation layer 186 can be made of an inorganic material such as SiOx or SiNx, but not limited thereto. The organic encapsulation layer 184 can be made of an organic insulating material such as acrylic resin, epoxy resin, polyimide, polyethylene, or silicon oxycarbon (SiOC), but limited thereto.

The first inorganic encapsulation layer 182 and the second inorganic encapsulation layer 186 serve to block the penetration of moisture or oxygen, and the organic encapsulation layer 184 serves to flatten a surface and to prevent cracks from occurring in the encapsulation layer 180 due to an external force.

A dam DAM is formed on the interlayered insulating layer 116 at a periphery of the non-display region NA. The organic material forming the organic encapsulation layer 184 has fluidity. Thus, when the organic encapsulation layer 184 is formed, the organic material can flow to the outside of the substrate 110 through the periphery of the non-display region NA due to the fluidity of the organic material. This may not only cause defects in the display apparatus 100 but also cause environmental pollution due to discharge of the organic material during process.

The dam DAM can be formed in a closed curve shape surrounding the display region AA and trap the organic material flowing out of the substrate 110 when the organic encapsulation layer 184 is formed, thereby preventing the organic material from flowing out of the substrate 110.

The dam DAM can be formed in a multi-layer structure. For example, as shown in FIG. 4, the dam DAM can be configured in a two-layer structure made of the same materials as the planarization layer 118 and the bank layer 152, but not limited thereto and can be configured in a single layer, or three or more layers.

In the drawing, one dam DAM placed on the interlayered insulating layer 116 is shown, but not limited thereto and two dams DAM, or three or more dams DAM can be placed at set intervals.

The polarizing plate POL is attached to the display panel, e.g., on the encapsulation layer 180. The polarizing plate POL is attached using an adhesive film such as OCA, but not limited thereto.

A plurality of lines 123 are disposed on the gate insulating layer 114 in the bending region BA. The lines 123 can include lines that apply driving signals such as data enable signal, vertical synchronization signal, horizontal synchronization signal, and clock signal, power lines that supply power signals such as high potential voltage (VDD) and low potential voltage (VSS), data link lines applying data signals, and/or gate link lines supplying scan signals.

The plurality of lines 123 can be formed of the same metal as and in the same process as the gate electrode 124, but not limited thereto.

In the drawing, the plurality of lines 123 are disposed on the gate insulating layer 114. Alternatively, at least one of the lines 123 can be formed on the buffer layer 112 and/or the interlayered insulating layer 116.

A micro protective layer MCL is formed on the bending region BA, e.g., on the interlayered insulating layer 116 in the bending region BA. At this time, when forming the micro protective layer MCL by coating a fluid organic material, the organic material flowing along the interlayered insulating layer 116 is coated to the polarizing plate POL to form the micro protective layer MCL. The micro protective layer MCL is in contact with a side surface of the polarizing plate POL.

The micro protective layer MCL is formed on the interlayered insulating layer 114, but not limited thereto. For example, the bank layer 152 can extend to the bending region BA so that the micro protective layer MCL can be formed on the bank layer 152.

Hereinafter, a method of fabricating the display apparatus 100 according to an embodiment of the present invention is described with reference to the drawings.

FIG. 5 is a flow chart illustrating a method of fabricating a display apparatus according to an embodiment of the present invention, and FIGS. 6A to 6D are views illustrating a method of fabricating a display apparatus according to an embodiment of the present invention in detail.

As shown in FIGS. 5 and 6A, the display panel PNL including the bending region BA is first fabricated, and the polarizing plate POL is prepared (step S101). The display panel PNL can be an organic electroluminescence display panel, liquid crystal display panel, quantum dot display panel, micro LED display panel, or mini LED display panel.

Figure 6B:
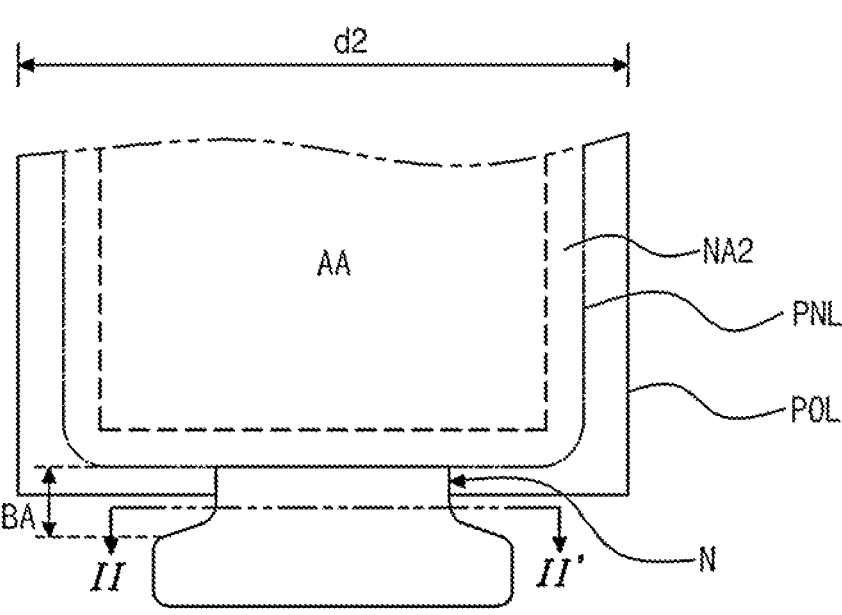
Figure 6B:
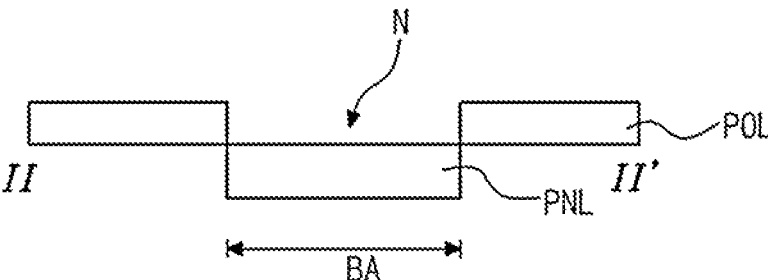

Next, as shown in FIGS. 5 and 6B, the polarizing plate POL is attached to the display panel PNL (step S102). The polarizing plate POL includes a flow control member for controlling flow of an organic material that is formed in a portion corresponding to the bending region BA. In this embodiment, the flow control member is a notch N formed in the polarizing plate PNL.

Referring to FIG. 6A, the polarizing plate POL is formed in an approximately quadrangular shape. At this time, a width d2 of the quadrangular polarizing plate POL is larger than a width d1 of the display panel PNL (i.e., d2>d1). Accordingly, when the polarizing plate POL is attached to the display panel PNL, the polarizing plate POL completely covers the display panel PNL and protrudes outside both sides of the display panel PNL.

Referring to FIG. 6A, a notch N is formed on one side of the polarizing plate POL. The notch N is formed at one end of the polarizing plate POL on the side corresponding to the second non-display region NA2 of the display panel PNL. The notch N is formed with set width b2 and depth c. At this time, the width b2 of the notch N is equal to a width b1 of the bending region BA of the display panel PNL (i.e., b2=b1).

The notch N can be formed by mechanically cutting the polarizing plate POL. For example, the notch N can be formed by cutting one end of the polarizing POL to set width and length using a cutter.

When attaching the polarizing plate POL to the display panel PNL, an inner end of the notch N coincides with an end of the second non-display region NA2 of the display panel PNL. Thus, when the polarizing plate POL is attached to the display panel PNL, a lower end of the polarizing plate POL protrudes outward from the end of the second non-display region NA2 of the display panel PNL by the depth c of the notch N.

As shown in the cross-sectional structure at a lower portion of FIG. 6B, the polarizing plate POL is attached on the upper surface of the display panel PNL, so that the polarizing plate POL of a certain height is disposed on both sides of the bending region BA of the display panel PNL.

Figure 6C:
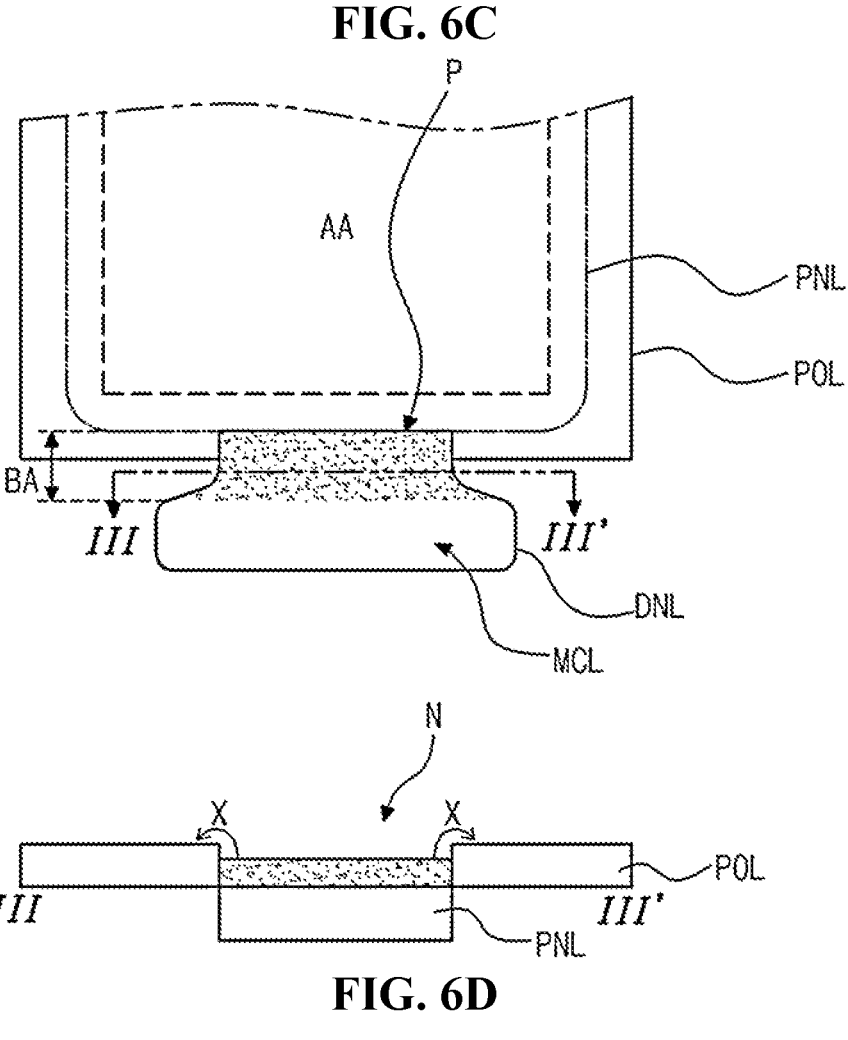

Next, as shown in FIGS. 5 and 6C, the micro protective layer MCL is formed in the bending region BA of the display panel PNL (step S103). The micro protective layer MCL is formed by coating an organic material such as a polymer. In this regard, after an organic material is discharged to a set region of the bending region BA, the organic material spreads throughout the bending region until it is blocked by the polarizing plate POL. In other words, the polarizing plate POL acts as a stopper to stop the spread of the fluid organic material, so that the micro protective layer MCL is formed from the bending region BA to the polarizing plate POL. The micro protective layer MCL is formed to be in contact with a side surface of the polarizing plate POL.

In particular, the organic material spreads inside the notch N of the polarizing plate POL, but since the polarizing plate POL along the side of the notch N acts as a stopper, the organic material does not flow out of the notch N. In other words, the micro protective layer MCL is formed in the bending region BA and inside the notch N of the polarizing plate POL.

Then, the coated organic material is cured to form the micro protective layer MCL. The organic material can be cured by applying heat or irradiating light such as ultraviolet rays, but not limited thereto.

Figure 6D:
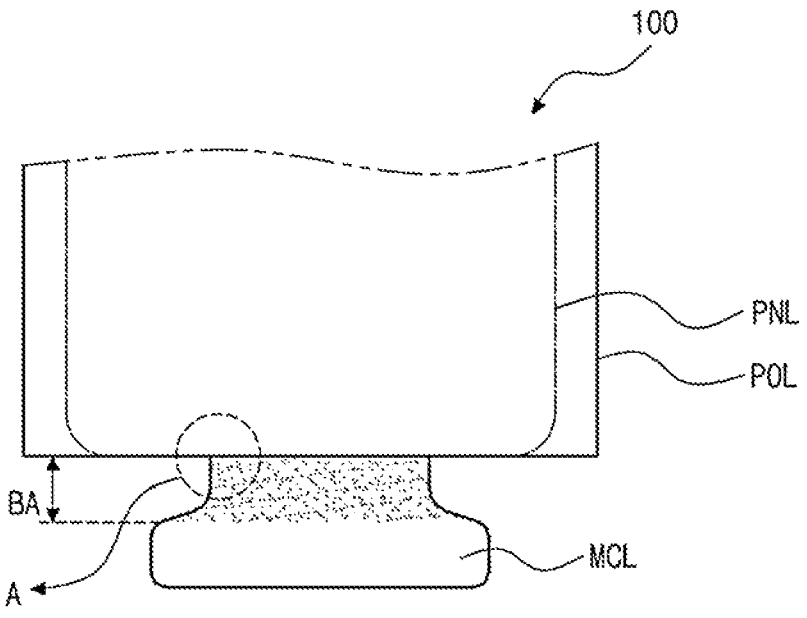

Next, as shown in FIGS. 5 and 6D, the polarizing plate POL is trimmed to remove the flow control member (i.e., the notch N) (step S104). The step of removing the flow control member includes trimming a portion of the polarizing plate POL that protrudes to the outside of the display panel PNL. By the trimming, the portion of the polarizing plate POL that protrudes to the outside of the second non-display region NA2 is removed, so that the shape of the polarizing plate POL becomes substantially the same as the shape of the display panel PNL. At this time, the trimming of the polarizing plate POL can be accomplished by irradiating a laser, but not limited thereto.

As such, in the display apparatus 100 according to an embodiment of the present invention, the polarizing plate POL with the notch N is attached to the display panel PNL, and then the organic material is coated on the bending region BA to form the micro protective layer MCL. Accordingly, it is possible to prevent the micro protective layer MCL from being formed outside the bending region BA, which is explained in more detail.

Figure 7:
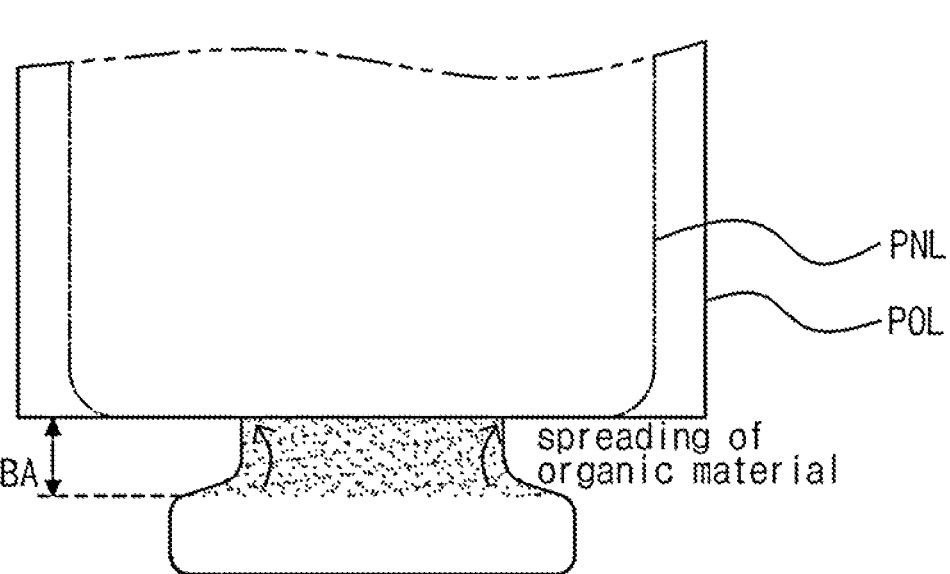
FIG. 7 is a view illustrating coating an organic material for forming a micro protective layer in a case in which a notch is not formed in a polarizing plate.

FIG. 7 is a view illustrating coating an organic material for forming a micro protective layer in a case in which a notch is not formed in a polarizing plate.

As shown in FIG. 7, the organic material dropped at a specific point of the bending region BA of the display panel PNL spreads outward and is coated on the entire bending region BA. At this time, the organic material spreading from the bending region BA to the second non-display region NA2 does no spread to the display region and stops due to the height of the polarizing plate POL attached on the display panel PNL.

However, in this structure, the lower end of the display panel PNL, for example, the end of the second non-display region NA2, and the end of the polarizing plate POL coincide with each other, so that the organic material spreading from the bending region BA to the polarizing plate POL spreads along the side end surface of the polarizing plate POL to the side end surface of the second non-display region NA2 of the display panel PNL.

When the organic material is cured to form the micro protective layer MCL, the organic material that has spread to the side end surface of the second non-display area NA2 of the display panel PNL is also cured, and the cured micro protective layer MCL is formed even on the lower end surface of the display panel PNL. However, since the micro protective layer MCL on the lower end surface of the display panel PNL has weak adhesive strength with the display panel PNL, it can fall off from the display panel PNL even with a slight external impact, and this fallen micro protective layer MCL acts as a foreign substance and causes defects in subsequent processes.

In order to prevent the micro protective layer MCL from falling off, an area of the polarizing plate POL is made larger than an area of the display panel PNL, so that the micro protective layer MCL formed on the lower end surface of the second non-display region NA2 of the display panel PNL is covered under the polarizing plate POL to prevent the micro protective layer MCL in this region from falling off.

However, in this case, a portion of the polarizing plate POL protrudes outward from the second non-display region NA2 of the display panel PNL, so that a problem occurs in which during reliability testing, the polarizing plate POL expands and shrinks according to temperature, and the polarizing plate POL is peeled off from the display panel PNL.

In an embodiment of the present invention, by forming the notch N in the polarizing plate POL, the organic material coated on the boundary between the second non-display region NA2 and the bending region BA of the display panel PNL is blocked from spreading out of the bending region BA, so that it is possible to prevent the micro protective layer MCL from being formed on the lower end surface of the display panel PNL.

Therefore, since it is possible to prevent peeling of the micro protective layer MCL in a region other than the bending region BA in advance, defects in subsequent processes can be prevented. In addition, since it is possible to prevent peeling of the micro protective layer MCL in a region other than the bending region BA in advance, it is possible to prevent defects such as peeling of the entire micro protective layer MCL and peeling of the polarizing plate POL caused by the peeling of the micro protective layer MCL in the other region.

Meanwhile, in an embodiment of the present invention, the notch N of the polarizing plate POL is formed before the attachment of the polarizing plate POL, and the polarizing plate POL attached to the display panel PNL is trimmed by the laser irradiation. In addition, the notch N of the polarizing plate POL is formed by mechanical cutting using a cutter, and the polarizing plate POL attached to the display panel PNL is trimmed by a laser.

Figure 8:
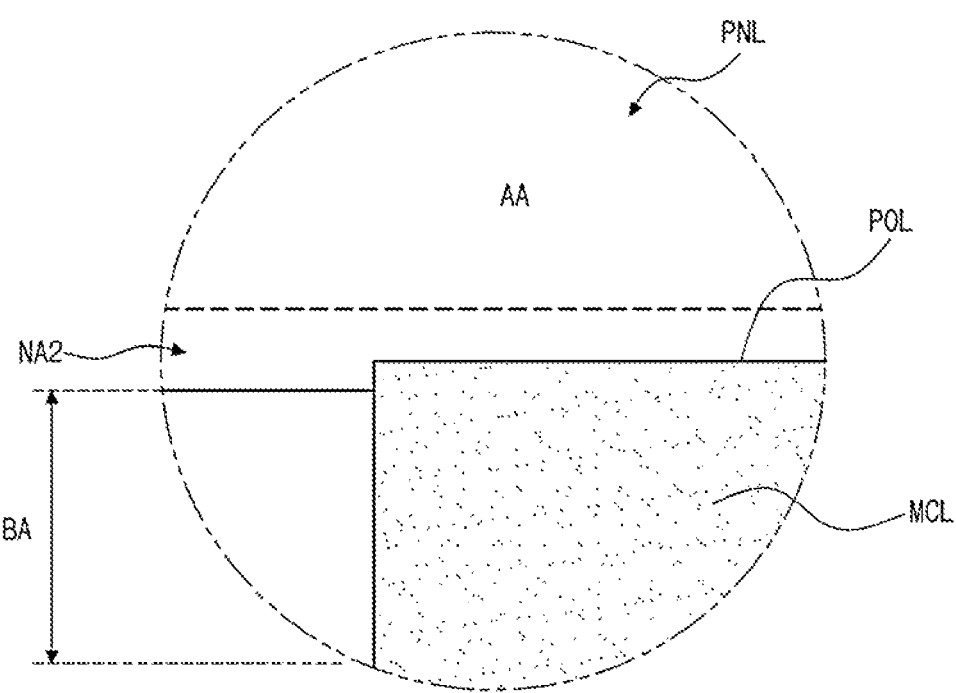
FIG. 8 is a view illustrating a cross section formed by mechanical cutting and a cross section formed by trimming being formed discontinuously.

In an embodiment of the present invention, the notch N of the polarizing plate POL is formed in advance by mechanical cutting, and the polarizing plate POL attached to the display panel PNL is then trimmed by the laser irradiation. Since the inner end of the notch N of the polarizing plate POL coincides with the lower end of the display panel PNL, the notch N is not trimmed but the outside of the notch N is trimmed. Accordingly, the inner side surface of the notch N and the trimmed surface can be formed in a substantially straight line, but since they are processed by different methods at different times, the end of the notch N of the polarizing plate POL and the trimmed end of the polarizing plate POL are formed discontinuously. In this regard, an end of the polarizing plate POL is formed discontinuously at a boundary between a portion of the polarizing plate POL corresponding to the bending region BA and a portion of the polarizing plate POL corresponding to the other region than the bending region BA. For example, as shown in FIG. 8, the trimmed end is formed in a shape that protrudes outward from the end of the notch N. That is, the portion of the polarizing plate POL corresponding to other region than the bending region BA protrudes outward more than the portion of the polarizing plate POL corresponding to the bending region BA.

In addition, a cross-sectional surface cut by mechanical cutting using a cutting device (i.e., a cut surface of a region corresponding to the bending region BA of the display panel PNL) and a cross-sectional surface trimmed by trimming (i.e., a cut surface of the second non-display region NA2 of the display panel PNL) are formed in different states. In other words, since the trimmed cross-sectional surface is melted and cut by a laser, a state of this cross-sectional surface has a surface morphology which is different from that of the cross-sectional surface caused by the mechanical cutting, there is a discontinuity, and in particular, there is a discontinuous surface morphology at a boundary between the cross-sectional surface of the notch N and the trimmed cross-sectional surface. That is, a cross-sectional surface of the polarizing plate POL is formed discontinuously at a boundary between the portion of the polarizing plate POL corresponding to the bending region BA and the portion of the polarizing plate POL corresponding to the other region than the bending region BA.

In the display apparatus according to an embodiment of the present invention, defects or other issues can be prevented or effectively addressed by controlling the flow (spreading) of the organic material forming the micro protective layer MCL by the polarizing plate POL attached to the display panel PNL. To this end, in the above-described structure, the flow of organic materials is controlled by forming the notch N in the polarizing plate POL, but the present invention is not limited to this specific structure.

Figure 9:
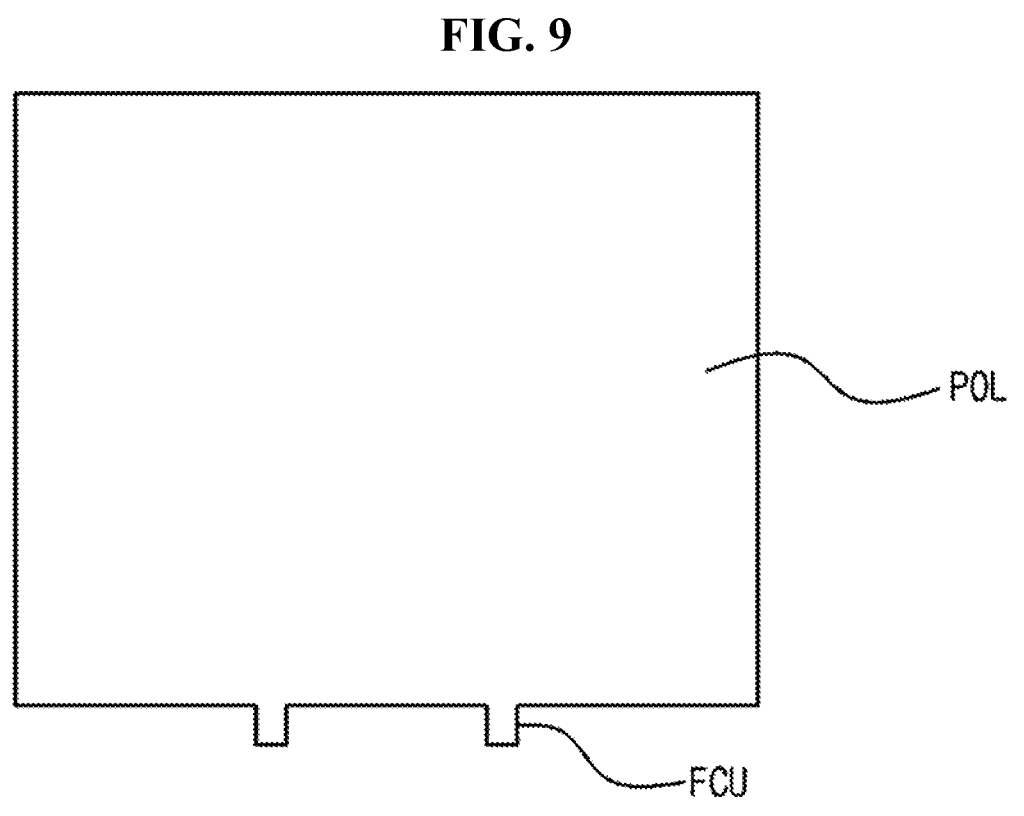

FIG. 9 is a view illustrating a polarizing plate of a display apparatus according to another embodiment of the present invention. At this time, the polarizing plate POL is a polarizing plate POL before being attached to a display panel.

As shown in FIG. 9, a flow control member FCU is formed in the polarizing plate POL of this embodiment to control the flow (spreading) of an organic material coated when forming a micro protective layer on the display panel. The flow control member FCU includes two bars that protrude from the polarizing plate POL and are spaced apart from each other at a certain distance, and the distance between the two bars are equal to a width of a bending region of the corresponding display panel.

Thus, when the organic material is coated on the bending region of the display panel in a state of the polarizing plate POL being attached to the display panel, the flow control member FCU blocks the organic material flowing out of the bending region, so that the micro protective layer is formed only in the bending region of the display panel and is not formed at a lower end of the display panel.

Meanwhile, in this embodiment, the polarizing plate POL excluding the flow control members FCU is formed in the same shape as the display panel to which the polarizing plate POL is attached, and in a state of the polarizing plate POL and the display panel being aligned, the polarizing plate POL is attached to the display panel.

Meanwhile, in this embodiment, the step of removing the flow control member includes removing the two bars. Thus, in this embodiment, there is no need to trim the polarizing plate POL along a circumference of the display panel, and only the flow control member FCU that protrudes out of the display panel needs to be removed after forming the micro protective layer, so that there is no need for a trimming process or a time of the trimming process can be shortened as much as possible.

However, even in this case, the polarizing plate is cut into the same shape as the display panel by a mechanical method, and the flow control member FCU is removed by a laser or the like after the polarizing plate POL is to the display panel. Thus, a discontinuous side cross section is formed between a region where the flow control member FCU is removed and the other region.

The flow control member FCU is formed of a shape of two bars that protrude to the outside from the polarizing plate POL, but the flow control member FCU is not limited to this shape, and can be formed in any shape as long as it can control the flow of the organic material.

In the display apparatus according to one or more embodiments of the present invention as described above, the micro protective layer is formed in the bending region to form the neutral plane at the position where various lines of the display panel are arranged, thereby preventing the lines from being damaged due to stress.

In one or more embodiments of the present invention, in forming the micro protective layer, the polarizing plate is provided with the stopper that controls the flow of organic material, thereby preventing the micro protective layer from being formed in a region other than the bending region. If the micro protective layer is formed in the region other than the bending region, the micro protective layer is peeled off, and this peeled-off micro protective layer causes defects in subsequent processes, but in one or more embodiments of the present invention, such the peeling of the micro protective layer can be prevented, the defects in subsequent processes can be prevented or minimized. In addition, the peeling of the micro protective layer outside the bending region causes peeling of the entire micro protective layer, but in one or more embodiments of the present invention, the peeling of the micro protective layer can be prevented, thereby preventing or minimizing the defect of the entire micro protective layer being peeled off.

In one or more embodiments of the present invention, it is possible to prevent environmental pollution due to the peeling of the organic material formed in the region other than the bending region.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A display apparatus, comprising:
a display panel including a display region, a non-display region, and a bending region;
a polarizing plate attached to the display panel; and
a micro protective layer disposed on the bending region,
wherein an end of the polarizing plate is formed discontinuously at a boundary between a portion of the polarizing plate corresponding to the bending region and a portion of the polarizing plate corresponding to a region other than the bending region, and
wherein the micro protective layer is in contact with a side surface of the discontinuous region of the polarizing plate.

2. The display apparatus of claim 1, wherein the micro protective layer includes an organic material.

3. The display apparatus of claim 2, wherein the micro protective layer allows lines and elements therebelow to be positioned in a neutral plane.

4. The display apparatus of claim 1, wherein the portion of the polarizing plate corresponding to the region other than the bending region protrudes outward more than the portion of the polarizing plate corresponding to the bending region.

5. The display apparatus of claim 1, wherein a cross-sectional surface of the polarizing plate is formed discontinuously at a boundary between a portion of the polarizing plate corresponding to the bending region and a portion of the polarizing plate corresponding to a region other than the bending region.

6. The display apparatus of claim 1, wherein the display panel is an organic electroluminescent display panel, a liquid crystal display panel, a quantum dot display panel, a micro light emitting diode (LED) display panel, or a mini LED display panel.

\* \* \* \* \*